US009544048B2

(12) United States Patent
Raveendran et al.

(10) Patent No.: US 9,544,048 B2
(45) Date of Patent: Jan. 10, 2017

(54) SYSTEM AND METHOD FOR PERSISTENT WIRELESS DOCKING

(71) Applicant: QUALCOMM Incorporated, San Diego, CA (US)

(72) Inventors: Vijayalakshmi R. Raveendran, San Diego, CA (US); Xiaolong Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 13/760,993

(22) Filed: Feb. 6, 2013

(65) Prior Publication Data

US 2013/0309973 A1  Nov. 21, 2013

Related U.S. Application Data

(60) Provisional application No. 61/649,863, filed on May 21, 2012, provisional application No. 61/651,991, filed on May 25, 2012, provisional application No. 61/658,352, filed on Jun. 11, 2012, provisional application No. 61/658,363, filed on Jun. 11, 2012.

(51) Int. Cl.
*H04B 7/00* (2006.01)
*H04M 1/00* (2006.01)
*H04B 7/26* (2006.01)
*G06F 13/40* (2006.01)
*G06F 1/16* (2006.01)
*H04M 1/723* (2006.01)
*H04M 1/725* (2006.01)

(52) U.S. Cl.
CPC ............... *H04B 7/26* (2013.01); *G06F 1/1632* (2013.01); *G06F 13/4068* (2013.01); *H04M 1/723* (2013.01); *H04M 1/7253* (2013.01)

(58) Field of Classification Search
CPC .. H04W 8/005; H04W 76/023; H04W 76/043; H04W 76/045
USPC .................. 455/41.2–41.3, 414.1, 418–420, 556.1, 455/557
See application file for complete search history.

(56) References Cited

U.S. PATENT DOCUMENTS

| | | | |
|---|---|---|---|
| 6,170,026 B1 | 1/2001 | Kimura et al. | |
| 6,282,590 B1 | 8/2001 | Ellis et al. | |
| 6,590,588 B2 | 7/2003 | Lincke et al. | |
| 7,213,047 B2 | 5/2007 | Yeager et al. | |
| 7,349,117 B2 | 3/2008 | Stavely et al. | |

(Continued)

FOREIGN PATENT DOCUMENTS

| | | |
|---|---|---|
| CN | 1581823 A | 2/2005 |
| CN | 1662913 A | 8/2005 |

(Continued)

OTHER PUBLICATIONS

International Search Report and Written Opinion—PCT/US2013/042060—ISA/EPO—Jul. 24, 2013.

(Continued)

*Primary Examiner* — Simon Nguyen
(74) *Attorney, Agent, or Firm* — Kevin M. Donnelly

(57) ABSTRACT

Various aspects of the present disclosure enable a persistent docking procedure that, once a persistent docking environment has been established, can simplify the future establishment of a docking environment between the dockee and docking host. Other aspects, embodiments, and features are also claimed and described.

58 Claims, 8 Drawing Sheets

(56) References Cited

U.S. PATENT DOCUMENTS

| | | | |
|---|---|---|---|
| 7,577,834 B1 | 8/2009 | Traversat et al. | |
| 7,590,075 B2 | 9/2009 | Pirzada et al. | |
| 7,954,150 B2 | 5/2011 | Croft et al. | |
| 8,036,600 B2 | 10/2011 | Garrett et al. | |
| 8,200,868 B1 | 6/2012 | 'T Hooft | |
| 8,254,992 B1 | 8/2012 | Ashenbrenner et al. | |
| 8,464,061 B2* | 6/2013 | Bradley | 713/171 |
| 8,472,436 B2 | 6/2013 | Meiri et al. | |
| 8,566,498 B2 | 10/2013 | Lemarchand et al. | |
| 2002/0169977 A1 | 11/2002 | Chmaytelli | |
| 2007/0274270 A1 | 11/2007 | Jones et al. | |
| 2008/0195788 A1 | 8/2008 | Tamir et al. | |
| 2008/0285626 A1* | 11/2008 | Claus et al. | 375/133 |
| 2008/0287062 A1* | 11/2008 | Claus et al. | 455/41.2 |
| 2008/0320587 A1* | 12/2008 | Vauclair et al. | 726/17 |
| 2009/0073945 A1 | 3/2009 | Seok | |
| 2011/0034127 A1 | 2/2011 | Wentink et al. | |
| 2011/0081860 A1* | 4/2011 | Brown et al. | 455/41.3 |
| 2011/0082939 A1 | 4/2011 | Montemurro et al. | |
| 2011/0082940 A1 | 4/2011 | Montemurro et al. | |
| 2011/0162035 A1 | 6/2011 | King et al. | |
| 2011/0199989 A1 | 8/2011 | Wietfeldt et al. | |
| 2011/0205351 A1 | 8/2011 | Nakamura et al. | |
| 2011/0276698 A1* | 11/2011 | Bigioi et al. | 709/227 |
| 2011/0320535 A1* | 12/2011 | Donaldson | 709/204 |
| 2012/0015604 A1* | 1/2012 | Abratowski et al. | 455/41.2 |
| 2012/0064829 A1 | 3/2012 | Hart et al. | |
| 2012/0099566 A1* | 4/2012 | Laine et al. | 370/338 |
| 2012/0115453 A1 | 5/2012 | Zheng | |
| 2012/0120892 A1 | 5/2012 | Freda et al. | |
| 2012/0120934 A1 | 5/2012 | Cho | |
| 2012/0158839 A1 | 6/2012 | Hassan et al. | |
| 2012/0265913 A1* | 10/2012 | Suumaki et al. | 710/303 |
| 2012/0304280 A1 | 11/2012 | Hayashida | |
| 2013/0029596 A1* | 1/2013 | Preston et al. | 455/41.1 |
| 2013/0086633 A1* | 4/2013 | Schultz | 726/2 |
| 2013/0091211 A1* | 4/2013 | Diab et al. | 709/204 |
| 2013/0095753 A1* | 4/2013 | Chen | 455/41.1 |
| 2013/0132613 A1* | 5/2013 | Chassot et al. | 710/5 |
| 2013/0189925 A1* | 7/2013 | Staskawicz et al. | 455/41.1 |
| 2013/0204962 A1 | 8/2013 | Estevez et al. | |
| 2013/0205032 A1* | 8/2013 | Polefko | 709/227 |
| 2013/0279698 A1* | 10/2013 | Bradley | 380/270 |
| 2013/0282932 A1* | 10/2013 | Robert et al. | 710/17 |
| 2013/0304959 A1 | 11/2013 | Chiang | |
| 2013/0311692 A1 | 11/2013 | Huang et al. | |
| 2013/0311693 A1 | 11/2013 | Huang et al. | |
| 2013/0311694 A1 | 11/2013 | Bhamidipati et al. | |
| 2014/0201415 A1 | 7/2014 | Huang et al. | |
| 2014/0289396 A1* | 9/2014 | Navasivasakthivelsamy et al. | 709/224 |
| 2014/0289422 A1* | 9/2014 | Singh et al. | 709/232 |
| 2015/0016417 A1* | 1/2015 | Dees et al. | 370/331 |
| 2015/0100715 A1 | 4/2015 | Huang et al. | |

FOREIGN PATENT DOCUMENTS

| | | |
|---|---|---|
| CN | 101015173 A | 8/2007 |
| CN | 101536476 A | 9/2009 |

OTHER PUBLICATIONS

Miller, et al., "Home Networking with Universal Plug and Play," IEEE Communications Magazine, Dec. 2001, pp. 104-109.

* cited by examiner

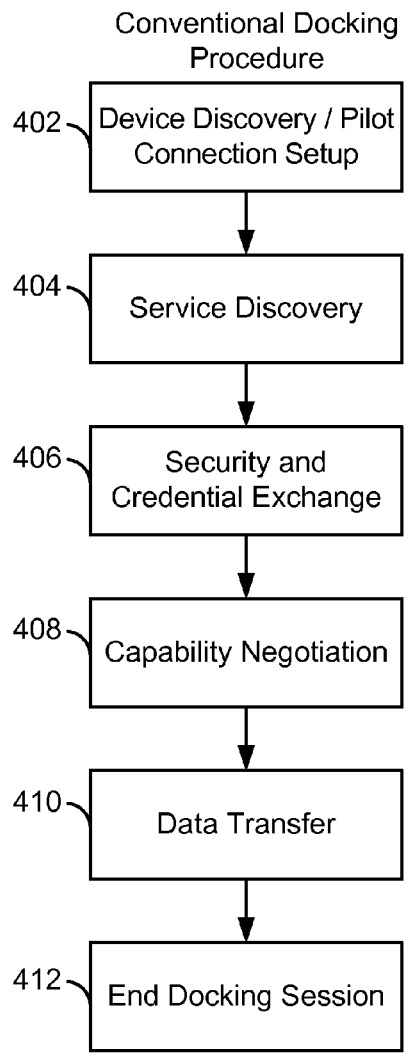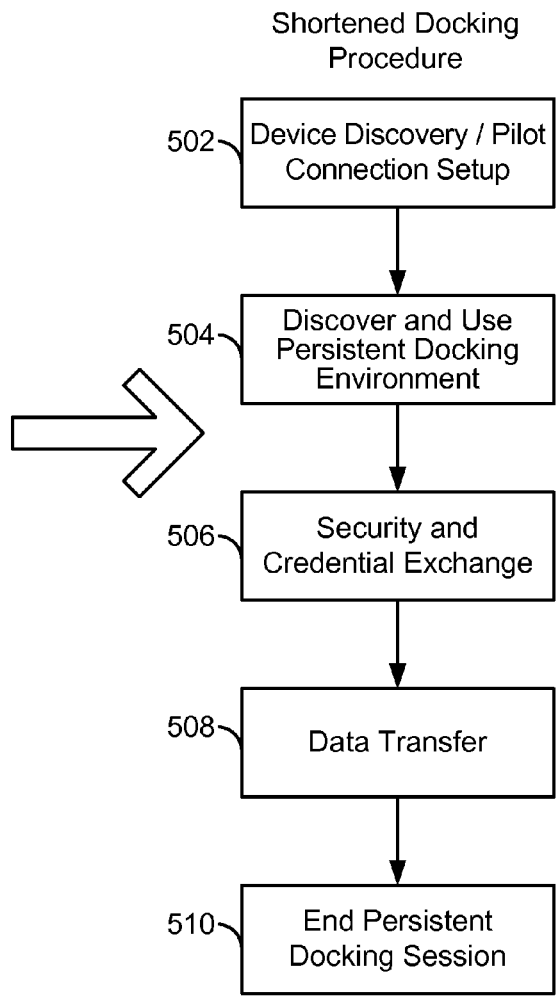
FIG. 4
FIG. 5

SYSTEM AND METHOD FOR PERSISTENT WIRELESS DOCKING

CROSS-REFERENCE TO RELATED APPLICATIONS

This application claims priority to and the benefit of provisional patent application no. 61/649,863, titled "SYSTEM AND METHOD FOR WIRELESS DOCKING UTILIZING A WIRELESS DOCKING PROFILE" and filed in the United States Patent and Trademark Office on May 21, 2012; Provisional Patent Application No. 61/651,991, titled "APPARATUS AND METHOD FOR PERSISTENT WIRELESS DOCKING" and filed in the United States Patent and Trademark Office on May 25, 2012; Provisional Patent Application No. 61/658,352, titled "APPARATUS AND METHOD FOR DIRECT PAIRING IN A WIRELESS DOCKING SYSTEM" and filed in the United States Patent and Trademark Office on Jun. 11, 2012; and Provisional Patent Application No. 61/658,363, titled "APPARATUS AND METHOD FOR WIRELESS DOCKING UTILIZING A WIRELESS DOCKING PROFILE IN THE PRESENCE OF WIRELESS DOCKING ENVIRONMENTS" and filed in the United States Patent and Trademark Office on Jun. 11, 2012, the entire contents of which are incorporated herein by reference.

TECHNICAL FIELD

Aspects of the present disclosure relate generally to wireless docking systems, and more particularly, to systems and methods of establishing wireless dock utilizing persistent wireless docking.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

Recent interest has been directed toward WLAN connectivity, where a dockee, e.g., a mobile device such as a cellular telephone, can utilize a WLAN interface (e.g., an IEEE 802.11 "Wi-Fi" interface) to establish wireless communication links with one or more peripheral devices. Here, peripheral devices can be any of numerous types, such as a mouse, keyboard, display, printer, camera, speakers, mass storage devices, media servers, sensors, and many others. Conventional creation of a docking session between a docking host and a dockee, which is generally required prior to enabling the dockee to utilize the peripherals coupled to the docking host, generally requires relatively complex procedures between the docking host and the dockee, which are repeated each time a new docking session is established. Further, it is frequently the case that the user of the dockee may be faced with complexity to establish a docking session.

As the demand for mobile broadband access continues to increase, research and development continue to advance wireless technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure enable a persistent docking procedure that, once a persistent docking environment has been established, can simplify the future establishment of a docking environment between the dockee and docking host.

For example, in one aspect, the disclosure provides a method operable at a docking host for docking with a dockee, the method including establishing a communication link with the dockee, discovering a persistent docking environment utilizing the communication link, the persistent docking environment comprising a prior docking environment established during prior communication with the dockee, and establishing a persistent docking session utilizing the persistent docking environment.

In another aspect, the disclosure provides a method operable at a dockee for docking with a docking host, the method including establishing a communication link with the docking host, discovering a persistent docking environment utilizing the communication link, the persistent docking environment comprising a prior docking environment established during prior communication with the docking host, and establishing a persistent docking session utilizing the persistent docking environment.

In another aspect, the disclosure provides a docking host configured for docking with a dockee, including at least one processor, a memory communicatively coupled to the at least one processor, and a communication interface communicatively coupled to the at least one processor. Here, the at least one processor is configured to establish a communication link with the dockee, to discover a persistent docking environment utilizing the communication link, the persistent docking environment comprising a prior docking environment established during prior communication with the dockee, and to establish a persistent docking session utilizing the persistent docking environment.

In another aspect, the disclosure provides a dockee configured for docking with a docking host, including at least one processor, a memory communicatively coupled to the at least one processor, and a communication interface communicatively coupled to the at least one processor. Here, the at least one processor is configured to establish a communication link with the docking host, to discover a persistent docking environment utilizing the communication link, the persistent docking environment comprising a prior docking environment established during prior communication with the docking host, and to establish a persistent docking session utilizing the persistent docking environment.

In another aspect, the disclosure provides a computer-readable storage medium operable at a docking host configured for docking with a dockee, including instructions for causing a computer to establish a communication link with the dockee, instructions for causing a computer to discover a persistent docking environment utilizing the communication link, the persistent docking environment comprising a prior docking environment established during prior communication with the dockee, and instructions for causing a computer to establish a persistent docking session utilizing the persistent docking environment.

In another aspect, the disclosure provides a computer-readable storage medium operable at a dockee configured for docking with a docking host, including instructions for causing a computer to establish a communication link with the docking host, instructions for causing a computer to discover a persistent docking environment utilizing the communication link, the persistent docking environment comprising a prior docking environment established during prior communication with the docking host, and instructions for causing a computer to establish a persistent docking session utilizing the persistent docking environment.

In another aspect, the disclosure provides a docking host configured for docking with a dockee, including means for establishing a communication link with the dockee, means for discovering a persistent docking environment utilizing the communication link, the persistent docking environment comprising a prior docking environment established during prior communication with the dockee, and means for establishing a persistent docking session utilizing the persistent docking environment.

In another aspect, the disclosure provides a dockee configured for docking with a docking host, including means for establishing a communication link with the docking host, means for discovering a persistent docking environment utilizing the communication link, the persistent docking environment comprising a prior docking environment established during prior communication with the docking host, and means for establishing a persistent docking session utilizing the persistent docking environment.

These and other aspects of the invention will become more fully understood upon a review of the detailed description, which follows.

BRIEF DESCRIPTION OF THE DRAWINGS

FIG. 4 is a flow chart illustrating a docking procedure without utilizing persistent docking according to one example.

FIG. 5 is a flow chart illustrating a shortened docking procedure utilizing persistent docking according to one example.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
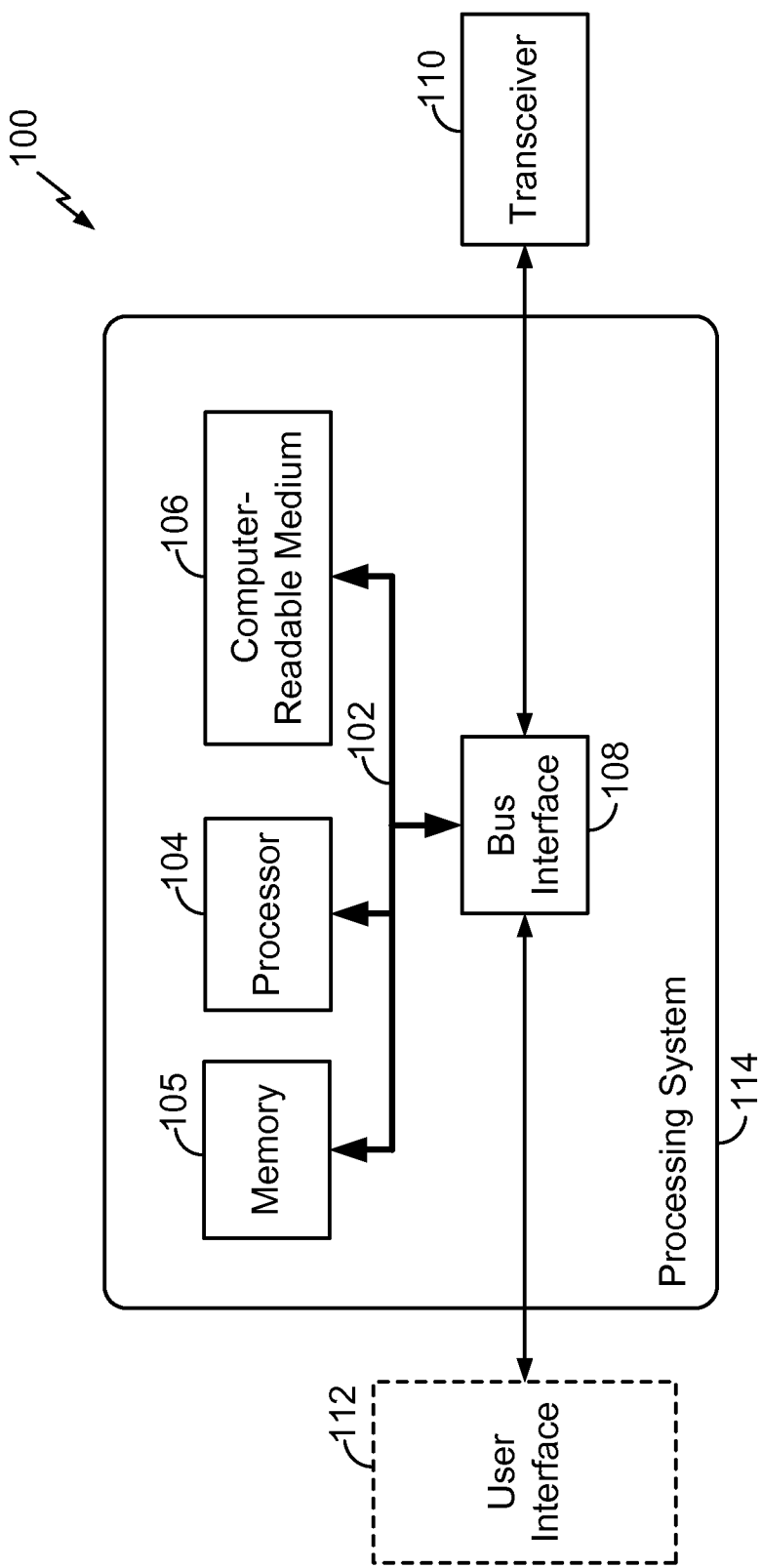
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the present disclosure, an element, or any portion of an element, or any combination of elements may be implemented with a processing system 114 that includes one or more processors 104. For example, in various aspects, the apparatus 100 may represent any one or more of a wireless dockee, a wireless docking host, and/or a peripheral device. Examples of processors 104 that may be utilized in an apparatus 100 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

One or more aspects of the disclosure relate to wireless docking systems. A wireless docking system can provide seamless connectivity, enabling a portable device such as a mobile handset, PDA, tablet computer, etc. to connect with a group of peripheral devices without needing wires or a docking connector, a PIN code or elaborate pairing process for between the dockee and each individual peripheral. The peripherals in any docking environment may act as a group, which needs only to be set up once. Many different types of peripherals may be supported in a docking environment, including the bridging of legacy peripherals. Ideally, the best link, protocol, and QoS would be automatically set up for each type of peripheral connection. The best connection may be selected depending on the application (e.g., for a productivity application, for watching videos, or for playing games, etc.), and the environment (e.g., the home enterprise, internet café, etc.). Here, existing application sessions/connections may be left intact.

Figure 2:
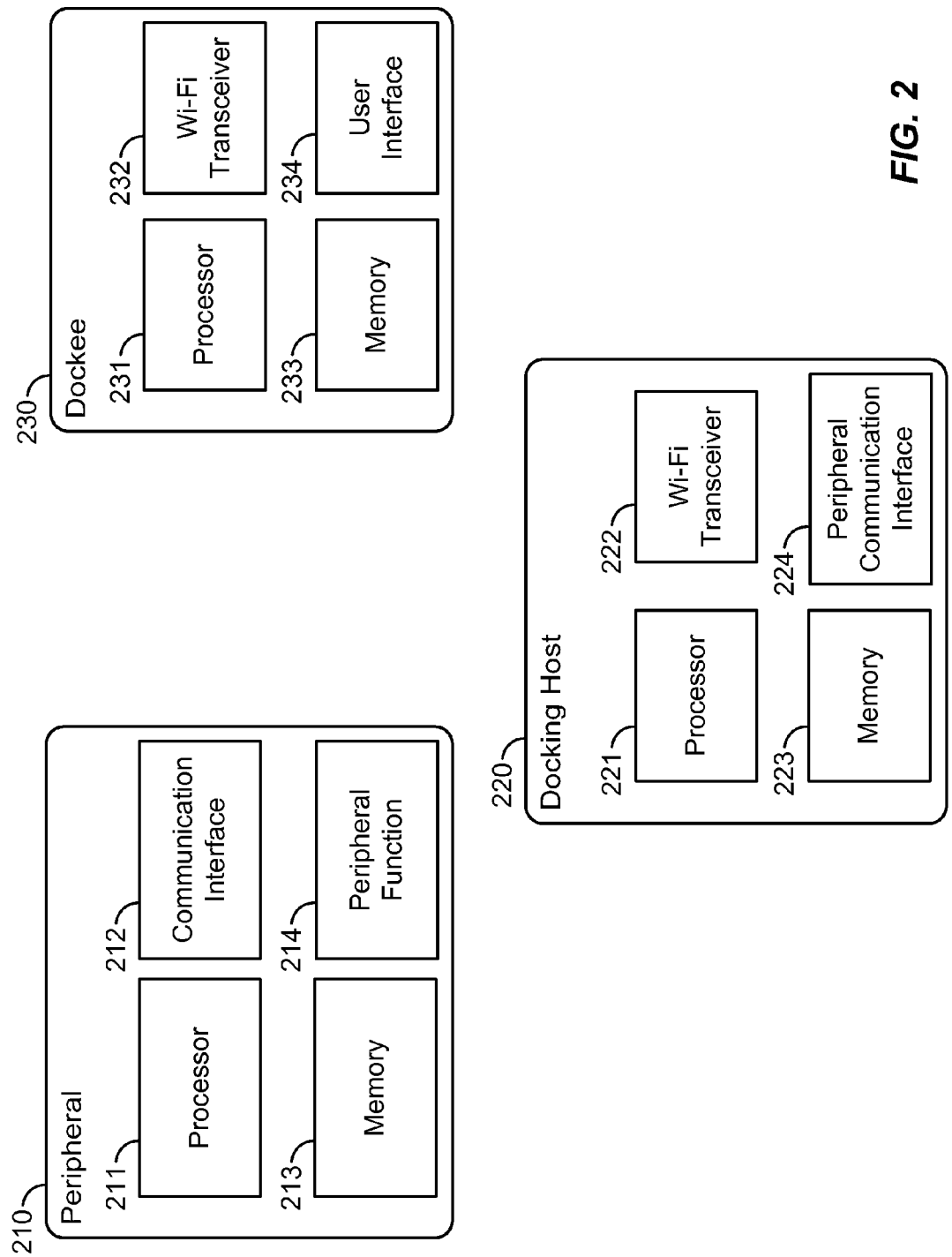
FIG. 2 is a simplified block diagram illustrating some of the components of a dockee, a docking host, and a peripheral as they may appear in a docking environment according to one example.

FIG. 2 includes a simplified block diagram illustrating an exemplary peripheral 210, an exemplary docking host 220, and an exemplary dockee 230 in accordance with some aspects of the disclosure. In the illustrated example, the peripheral 210 includes at least one processor 211, a memory 213 communicatively coupled to the at least one processor 211, a communication interface 212 communicatively coupled to the at least one processor 211, and optional peripheral function circuitry 214. In some aspects of the disclosure, the at least one processor 211 may be the processor 104 included in the processing system 114 described above and illustrated in FIG. 1; similarly, the memory 213 may be the memory 105 described above and illustrated in FIG. 1.

In various aspects of the disclosure, the communication interface 212 may be a wired and/or wireless interface configured for communication with a docking host 220. For example, a wired communication interface 212 may include a USB interface, a PS/2 interface, a serial bus interface, or any other suitable wired communication interface. In another example, a wireless communication interface 212 may include a Wi-Fi interface compatible with any of the family of standards defined under the IEEE 802.11 standards, an IEEE 802.15.1 "Bluetooth" interface, an IEEE 802.15.4 "ZigBee" interface, or any other suitable wireless communication interface. Of course, some examples of a peripheral 210 may include two or more of the above-described or other communication interfaces. Further, when included in a peripheral 210, the peripheral function circuitry 214 may be embodied in any number of ways, including for example a user interface, a display, microphone, speaker, network interface, etc.

Further, in the illustrated example, the docking host 220 includes at least one processor 221, a Wi-Fi transceiver 222 communicatively coupled to the at least one processor 221, a memory 223 communicatively coupled to the at least one processor 221, and a peripheral communication interface 224 communicatively coupled to the at least one processor 221. In some aspects of the disclosure, the at least one processor 221 may be the processor 104 included in the processing system 114 described above and illustrated in FIG. 1; similarly, the memory 222 may be the memory 105 described above and illustrated in FIG. 1.

In various aspects of the disclosure, the Wi-Fi transceiver 222 may be a relatively high-bandwidth communication interface adapted for communication between the docking host 220 and the dockee 230. For example, the Wi-Fi transceiver 222 may be configured to utilize any of the various communication protocols defined by the IEEE 802.11 family of standards. Of course, these protocols are only one example, and within the scope of the disclosure, any suitable wireless communication protocol may be utilized for communication between the docking host 220 and the dockee 230.

In a further aspect of the disclosure, the docking host 220 may additionally include a peripheral communication interface 224. In some examples, the peripheral communication interface 224 may include an IEEE 802.15.1 "Bluetooth" interface, an IEEE 802.15.4 "ZigBee" interface, or any other suitable wireless communication interface. In some examples, the Wi-Fi transceiver 222 and the peripheral communication interface 224 may be one and the same component.

Still further, in the illustrated example, the dockee 230 includes at least one processor 231, a Wi-Fi transceiver 232 communicatively coupled to the at least one processor 231, a memory 233 communicatively coupled to the at least one processor 231, and a user interface 234 communicatively coupled to the at least one processor 231. In some aspects of the disclosure, the at least one processor 231 may be the processor 104 included in the processing system 114 described above and illustrated in FIG. 1; similarly, the memory 232 may be the memory 105 described above and illustrated in FIG. 1.

In various aspects of the disclosure, the Wi-Fi transceiver 232 may be a relatively high-bandwidth communication interface adapted for communication between the dockee 230 and the docking host 220. For example, the Wi-Fi transceiver 232 may be configured to utilize any of the various communication protocols defined by the IEEE 802.11 family of standards. Of course, these protocols are only one example, and within the scope of the disclosure, any suitable wireless communication protocol may be utilized for communication between the dockee 230 and the docking host 220.

In a further aspect of the disclosure, the dockee 230 may include a user interface 234 for input/output functionality enabling communication between a user and the wireless docking system. As an illustrative but non-limiting example, the dockee 230 may be embodied as a smartphone or tablet device, including a touch-screen interface providing user input and output functionality.

Figure 3:
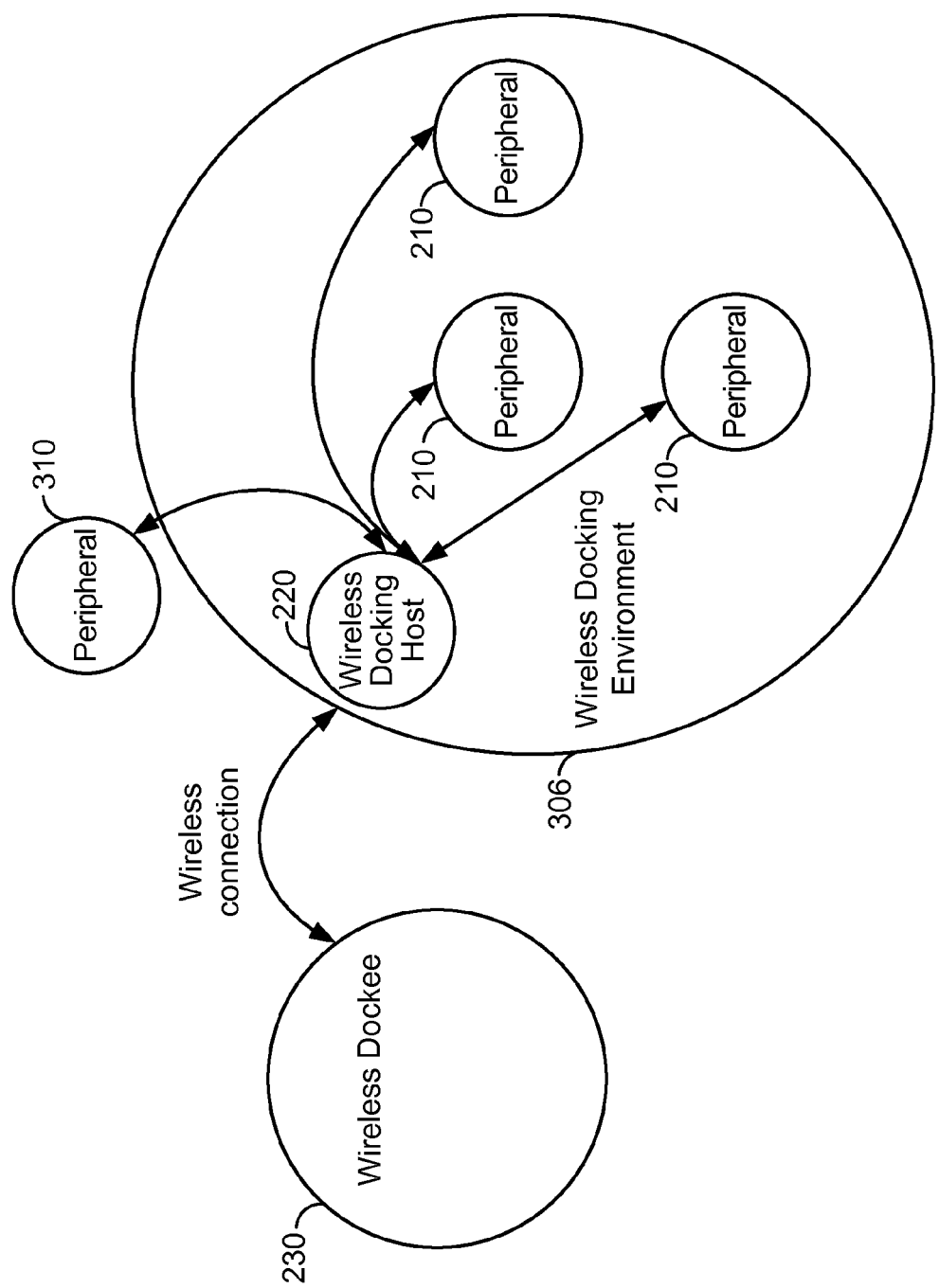
FIG. 3 is a simplified schematic diagram of a conventional wireless docking system utilizing a docking environment.

A conventional wireless docking system may provide a wireless connection between a wireless dockee and a wireless docking environment. FIG. 3 is a simplified schematic diagram that illustrates a conventional wireless docking system 300 including a dockee 230 in wireless communication with a plurality of peripherals 210, 310 by way of a wireless docking host 220, as a part of a wireless docking environment 306.

The dockee 230 may be any suitable device capable of wirelessly connecting to the wireless docking environment 306 utilizing any suitable communication protocol, which may include but is not limited to IEEE 802.11 "Wi-Fi." By connecting to the wireless docking environment 306, the dockee 230 may be capable of connecting directly or indirectly to each of the peripherals 210 that are part of the wireless docking environment 306.

The wireless docking environment 306 is a group of one or more physical devices, including one or more wireless docking hosts 220 and one or more peripherals 210. A wireless docking environment 306 can take any suitable configuration or topology, for example, including nothing more than a wireless docking host 220, or additionally including one or more peripherals 210.

The peripherals 210 may represent logical peripheral functions. In general, a peripheral function may be any I/O function implemented in a wireless docking host 220 that can be made available to a wireless dockee 230 through any of various suitable wireless interfaces; any I/O function in an external peripheral device that can be made available to the wireless dockee 230 through the wireless docking host 220, where the external peripheral device may be directly connected to the wireless docking host 220; or any I/O function in an external peripheral device that can be connected directly to the wireless dockee 230, and whose connection to the wireless dockee 230 is set up utilizing information provided by the wireless docking host 220. Peripherals 210 may in some examples be embodied as physical devices having wired and/or wireless interfaces for communicating with the wireless dockee 230 through the wireless docking host 220. Some nonlimiting examples of peripherals might include monitors or displays, speakers, microphones, keyboards, mouse, cameras, media servers, sensors, printers, scanners, mass storage devices, USB interfaces, Ethernet interfaces, etc.

In the illustration, some peripherals 210 are shown in the wireless docking environment 306, and an extra peripheral 310 is shown outside the wireless docking environment 306. Here, this extra peripheral 310 illustrates that not necessarily all peripherals 210, 310 that are paired with the wireless docking host 220 are included in a particular wireless docking environment 306. That is, a wireless docking environment 306 associated with a wireless docking host 220 may include only a subset of the peripherals 210, 310 that are paired with, or in communication with the docking host 220. Moreover, the extra peripheral 310 may be one of numerous extra peripherals 310, and further, the wireless docking host may provide a plurality of wireless docking environments such as the environment 306. Here, the set of peripherals in a particular wireless docking environment may include any number, from zero or greater, of peripherals, and further, in some examples, a particular peripheral 210, 310 may be included in zero, one, two, or more established wireless docking environments 306.

The wireless docking host 220 may be any suitable device capable of connecting to the wireless dockee 230 and one or more peripherals 210. For example, a wireless docking host 220 may make available to a wireless dockee 230 peripheral functions on external peripherals 210 that are connected to the docking host 220 directly, as well as peripheral functions the wireless docking host 220 itself may implement (e.g., a display).

The wireless docking host 220 may provide different docking experiences or docking environments 306 to different wireless dockees 230. For example, at a given time a wireless dockee 230 may have a particular need for certain peripheral functions, and upon learning of this need, the wireless docking host 220 may therefore provide a corresponding docking environment 306 for that dockee.

One example of a way for a docking host to provide these capabilities to different dockees is for the docking host to preconfigure multiple docking environments. That is, multiple groups of peripherals can be preconfigured at the docking host, e.g., by randomly selecting groups of available peripherals or by selecting certain peripherals to be grouped together. Here, each group may be a logical group including suitable peripherals, which may be manually or automatically configured with the docking host.

In this example, the docking host may group its attached and/or wirelessly paired peripherals into multiple hierarchical groups and enable each dockee to use one group. For example, assume that a particular docking host has peripherals A-G available. Here, peripherals A, B, and C may be grouped together into a first group, and peripherals D, E, F, and G may be grouped together into a second group. This way, the groups may be disjoint groups of peripherals. In another example, peripherals A, B, and C may be grouped together into a first group, and peripherals C, D, and E may be grouped together into a second group. This way, the groups may have some intersection or overlap of peripherals (i.e., peripheral sharing may be an option).

With a hierarchical grouping, separate groups of peripherals might be disjoint groups, and separate groups might have a common parent. For the common parent, peripherals A, B, C, D, E, and F might be a parent group in the hierarchy, and at the next level of the hierarchy, groups might include, for example, peripherals A, B, and C as a first group; and peripherals D, E, and F as a second group. By utilizing such groups of peripherals, each such group can be considered a separate wireless docking environment 306 as discussed above. That is, a particular wireless docking host 220 may be capable of providing any from a plurality of wireless docking environments 306 to a particular wireless dockee 230, each wireless docking environment 306 including a different group of peripherals that may be one of a plurality of preconfigured hierarchical groups.

When multiple docking environments are available, various complexities in the creation of a docking session can arise for both the user and the dockee 230, and for the docking host 220. For example, with disjoint docking environments, peripheral sharing may be difficult when it is desired for the docking host 220 to configure multiple docking environments. On the other hand, without disjoint docking environments, i.e., with peripheral sharing, reconciling peripheral use conflicts may be complex when the docking host 220 desires to configure multiple environments. Thus, pre-grouping peripherals into several disjoint sets may conflict with a user's needs. Moreover, protocol complexity results when advertising multiple environments and their properties, making selections among multiple environments with a single docking host 220. It is furthermore complex for users to understand the relations between peripherals and preconfigured multiple docking environments to facilitate decision making. With these complexities, the presence of multiple docking hosts 220 may render operating on multiple environments per docking host 220 much less useful.

Therefore, according to various aspects of the present disclosure, some of the complexities associated with the availability of multiple docking environments at a docking host 220 may be hidden from a dockee 230, thus simplifying the docking experience for users. For example, the utilization of a persistent docking environment may be enabled between a dockee 230 and a docking host 220, to simplify the complexity associated with the availability of large numbers of docking environments. As described in further detail below, a persistent docking environment may include configuration information saved at a docking host 220 for a dockee's use, in the form of peripherals, their protocols, and/or their connection types.

In a conventional wireless docking system, the establishment of a docking session between the dockee 230 and the docking host 220 can involve a relatively large number of steps including discovery, negotiation, etc. For example, FIG. 4 illustrates a conventional docking procedure that might be utilized to establish a docking session. The conventional docking procedure includes a series of sequential steps, including device discovery and pilot connection setup 402; service discovery 404; security and credential exchange 406; and capability negotiation 408, after which, at 410, the docked devices can begin to transfer data. At 412, the docking session may end, e.g., when the dockee 230 leaves the proximity of the docking host 220, or perhaps when the user of the dockee 230 explicitly ends the docking session.

Conventionally, it is generally required for a docking system to undergo each of steps 402-408 at the initiation of each docking session, even between the same devices, after a prior docking session is ended. However, it may be undesirable to be required to repeat certain portions of this procedure, such as the service discovery and capability/connection negotiation procedures 404 and 408, respectively, every time a docking session is established. Therefore, various aspects of the present disclosure provide systems and apparatus for persistent docking, in which a dockee 230 can skip the service discovery 404 and capability/connection negotiation 408, and jump to establishing data connections for using the peripherals 210 in the persistent docking environment. That is, persistent docking, according to some aspects of the present disclosure, is a feature that enables a dockee 230 to skip service discovery and capability negotiation procedures for a known docking environment provided by a docking host 220 that has been previously used by a dockee 230. Here, the docking environment may be a predetermined environment configured at the docking host 220, or may be a dynamically created docking environment, created by the docking host 220 for the dockee 230. In any case, when the dockee 230 returns, according to an aspect of the disclosure, the dockee 230 may re-use the docking environment utilized before, skipping the service discovery and capability negotiation procedures.

For example, FIG. 5 is a flow chart illustrating one example of a shortened docking procedure as it may be implemented for a persistent docking session in accordance with some aspects of the disclosure. In this example, at 502, a device discovery and pilot connection setup phase may be implemented, in the same or similar way as at step 402 in the conventional docking procedure. However, as described in further detail below, the dockee 230 and/or the docking host 220 may advertise their respective capability of implementing persistent docking. Here, at step 504, if a persistent docking environment has been established between the dockee 230 and the docking host 220, the devices may discover and determine to use this persistent docking environment. Here, because the information is known, the service discovery phase 404 and the capability negotiation phase 408 may be skipped. At optional step 506, a security and credential exchange may be implemented between the dockee 230 and the docking host 220, and at step 508, data transfer corresponding to the docking session may begin. Finally, in the same or similar way as step 412 in the conventional docking session, at step 510 the persistent docking session may end.

Figure 6:
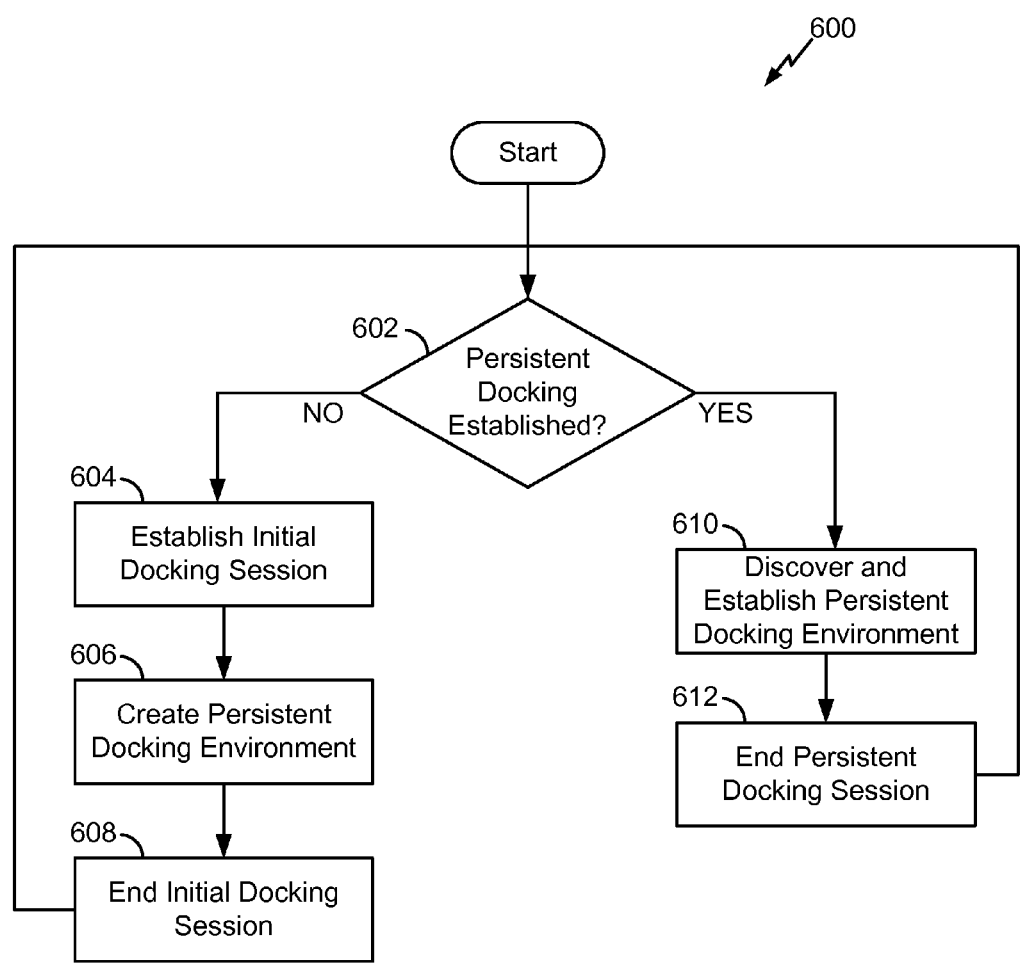
FIG. 6 is a flow chart illustrating additional detail of a persistent docking procedure according to one example.

FIG. 6 is a simplified flow chart illustrating an exemplary process 600 for docking, wherein the capability for persistent docking is available at the dockee 230 and the docking host 220. In various aspects of the present disclosure, either one, or both, of the dockee 230 and/or the docking host 220 may be capable of managing a negotiation between the two entities to create the persistent docking environment. In this simplified illustration, at step 602, the dockee 230 and/or the docking host 220 may determine whether a persistent docking session has been established. For example, if a prior docking session provided for a suitable exchange of information between the dockee 230 and the docking host 220, the persistent docking session may be available, thus providing for a simplified docking procedure. However, if, for example, this is the first time a docking session is to be established between the dockee 230 and the docking host 220, the persistent docking session may not have been established, and therefore, the process may proceed to step 604, wherein an initial docking session may be established. Next, at 606 a persistent docking environment may be created and corresponding information may be, for example, stored at one or both of the docking host 220 and/or the dockee 230. At step 608, the initial docking session may end, and the process may proceed to step 602, such as when the dockee 230 once again approaches the proximity of the docking host 220. Here, because the persistent docking environment was created at step 606, the process may determine that the persistent docking environment has been established, and thus the process may proceed to step 610, wherein the dockee 230 and/or the docking host 220 may discover and establish the persistent docking environment. At a later time, at step 612 the persistent docking session may end.

Creating a Persistent Docking Environment

Figure 7:
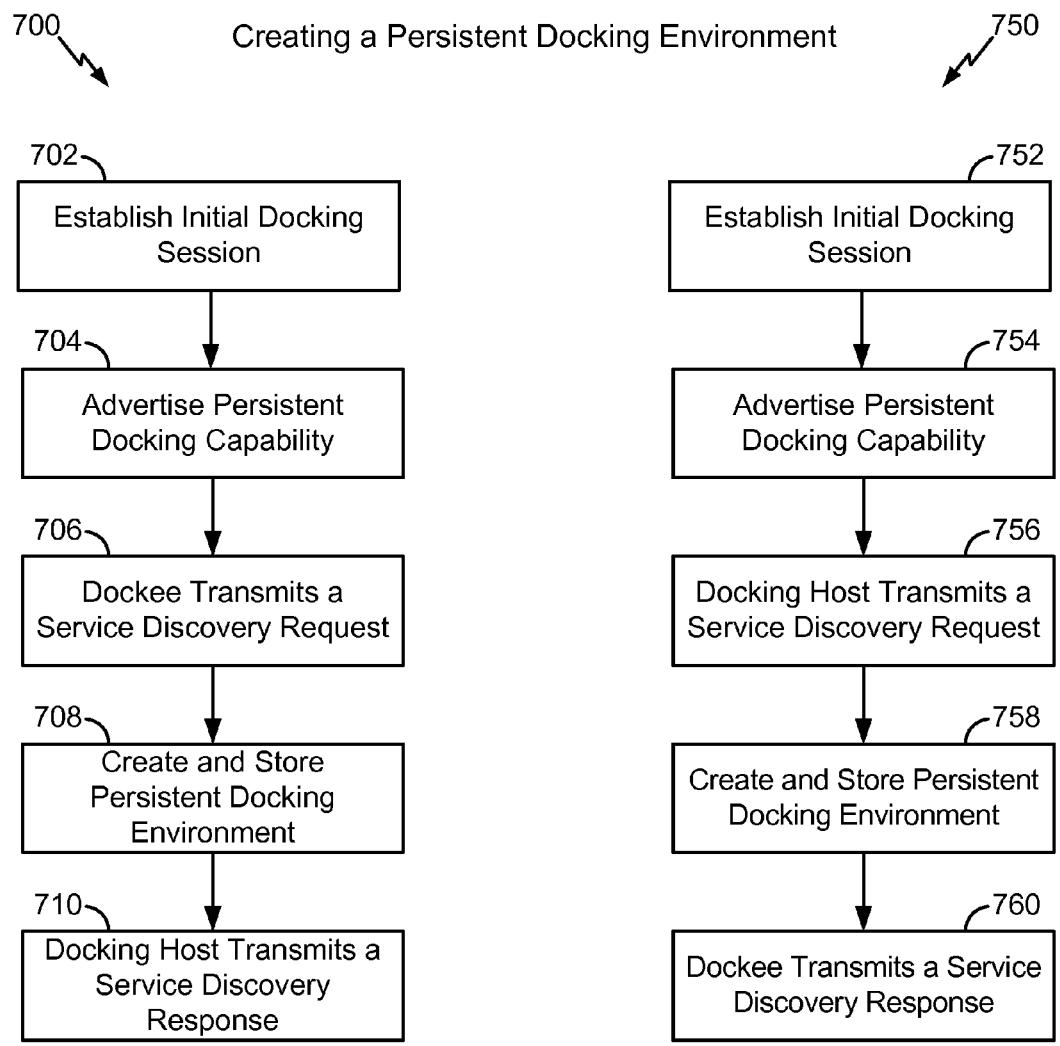
FIG. 7 is a flow chart illustrating a process for creating a persistent docking environment according to one example.

FIG. 7 is a flow chart illustrating two exemplary processes 700 and 750 for creating a persistent docking environment, at least a portion of which may correspond to step 606 described above with respect to FIG. 6. That is, in some aspects of the disclosure, the persistent docking environment may be established or created during an initial docking session, or during any suitable docking session wherein the creation of the persistent docking environment may be desired.

Processes 700 and 750 are largely similar, except for certain aspects corresponding to a direction of communication. For example, as described in further detail below, process 700 corresponds to an example wherein the dockee 230 requests the establishment of a persistent docking session; wherein process 750 corresponds to an example wherein the docking host 220 requests the establishment of a persistent docking session.

Referring now to process 700, at step 702, the initial docking session may be established. For example, when the dockee 230 approaches the docking host 220, a device discovery and pilot connection setup phase may be undertaken, such that communication between the dockee 230 and the docking host 220 may be established.

At step 704, the dockee 230 and/or the docking host 220 may advertise the availability of a persistent docking capability. For example, the dockee 230 may transmit an indication that it supports persistent docking in the device discovery phase 402, 502. In some aspects, the indication may be in the form of a bit field in a docking information element transmitted from the dockee 230 to the docking host 220. In another example, the docking host 220 may transmit an indication of whether it supports persistent docking in the device discovery phase 402, 502. In some aspects, the indication may be in the form of a bit field in a docking information element transmitted from the docking host 220 to the dockee 230. By utilizing this advertisement, it can be understood between the docking host 220 and the dockee 230 that a persistent docking environment can be established for future use.

Thus, at step 706, the dockee 230 may transmit a service discovery request message to request the docking host 220 to make the docking environment in use a persistent docking environment. That is, during a discovery phase, in one example, based on the reception of a persistent docking indication/advertisement from the docking host 220, the dockee 230 may know that the docking host 220 supports persistent docking. Thus, the dockee 230 may know that the docking host 220 is capable of saving a prior configuration for future use. In this case, the dockee 230 may transmit a request (e.g., a service discovery request message) to the docking host 220, requesting the docking host 220 to save an existing docking environment as a persistent docking environment for utilization during a future docking session.

Responsive to the request to create the persistent docking environment, at step 708 the docking host 220 may create the persistent docking environment, including the configuration information of the docking environment being used. For example, the docking host 220 may store information within a memory 223 corresponding to the persistent docking environment. The information of the docking environment may include, for example, the set of peripherals being utilized by the dockee 230, their configuration, connection information corresponding to the communication interface between the dockee 230 and the docking host 220, or any other suitable information corresponding to a persistent docking environment.

At step 710, the docking host 220 may transmit a service request discovery response message, configured to acknowledge (e.g., grant or reject) the request to create the persistent docking environment. In this way, the dockee 230 may be notified of the success or failure of the creation of the persistent docking environment, such that later communication with the docking host 220, e.g., when a second or subsequent docking session is desired to become established, may include an indication of the existence of the persistent docking environment.

Referring now to process 750, step 752 may be the same as or similar to step 702 described above for the establishment of an initial docking session. Similarly, step 750 may be the same as or similar to step 704, wherein one or both of the dockee 230 and/or the docking host 220 may advertise a persistent docking capability.

At step 756, the docking host 220 may transmit a service discovery request message to request or suggest to the dockee 230 to make the docking environment in use a persistent docking environment. That is, during the discovery phase, in one example, based on the reception of the persistent docking indication/advertisement from the dockee 230, the docking host 220 may know that the dockee 230 supports persistent docking. Thus, the docking host 220 may know that the dockee 230 is capable of saving a prior configuration for future use. In this case, the docking host 220 may transmit a request (e.g., the service discovery request message) to the dockee 230 to save an existing docking environment as a persistent docking environment for utilization during a future docking session. Thus, at step 758, for example, the dockee 230 may store information within a memory 233 corresponding to the persistent docking environment. At step 760, the dockee 230 may transmit a service request discovery response message, configured to acknowledge (e.g., grant or reject) the request to create the persistent docking environment. In this way, the docking host 220 may be notified of the success or failure of the creation of the persistent docking environment.

Over time, it may be possible for multiple persistent docking environments to be created for a particular dockee 230 to utilize when docking with the docking host 220. Here, signaling may be utilized to select a stored persistent docking environment from among the available persistent docking environments. In some aspects of the disclosure, a unique persistent docking environment ID may be created at the docking host 220 for each persistent docking environment created. Here, the persistent docking environment ID may correspond to a particular docking environment and a particular dockee 230. This unique persistent docking environment ID may be transmitted either solicited or unsolicited in a persistent docking response from the docking host 220 to the dockee 230.

Persistent Docking Environment Establishment Procedure

Figure 8:
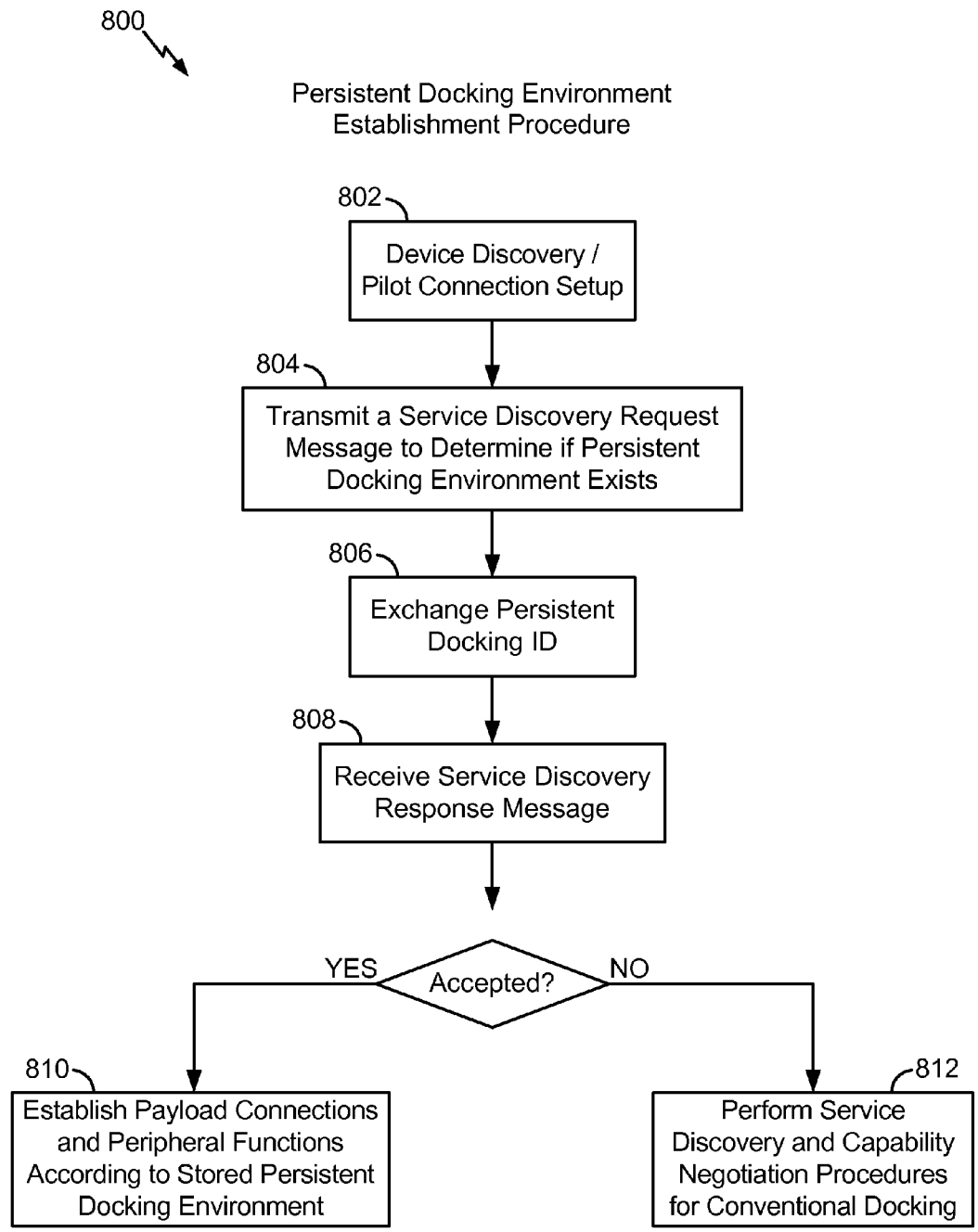
FIG. 8 is a flow chart illustrating a process for establishing a persistent docking environment according to one example.

As described above, once a persistent docking environment has been created between a dockee 230 and a docking host 220, when later the dockee 230 wishes to dock with the docking host 220, the persistent docking environment may be established. FIG. 8 is a flow chart illustrating an exemplary process 800 for establishing the persistent docking environment in accordance with an aspect of the disclosure, at least a portion of which may correspond to step 504 described above and illustrated in FIG. 5. In accordance with an aspect of the disclosure, as described above in relation to FIG. 5, the establishment of the persistent docking environment can enable docking while skipping the service discovery phase and capability negotiation phases utilized in a conventional docking procedure.

That is, at step 802, a device discovery and the pilot connection setup phase may take place, which may be the same as or similar to the device discovery and pilot connection setup phases 402 and 502, described above. At step 804, in an aspect of the disclosure, the dockee 230 may transmit a service discovery request message to the docking host 220, to query the docking host 220 to provide a persistent docking environment. In another aspect of the disclosure, the docking host 220 may transmit the service discovery request message to the dockee 230, to query the dockee 230 whether it would desire to use a persistent docking environment.

At step 806, either as part of the service discovery request message transmitted in step 804 or in a separate message, the dockee 230 and/or the docking host 220 may identify a selected persistent docking environment in accordance with a unique persistent docking environment ID assigned by the docking host 220 in its creation, if such a persistent docking environment ID was created, as described above. At step 808, the docking host 220 (or the dockee 230) may then transmit a service discovery response message to acknowledge (e.g., to accept or reject) the request for persistent docking.

If accepted, then the process may proceed to step 810, wherein the dockee 230 and the docking host 220 may then establish payload connections and peripheral functions according to the stored persistent docking environment. If rejected, however, the process may proceed to step 812, wherein the dockee 230 and the docking host 220 may continue with the service discovery and capability negotiation procedures for regular, conventional docking.

Persistent Docking Removal Procedure

In some aspects of the disclosure, it may be desired to have the capability to remove a stored persistent docking environment. For example, if a persistent docking environment has not been utilized for an extended period of time, or if memory for storing persistent docking environments is limited, etc. Thus, in an aspect of the disclosure, the docking host 220 may assign an expiration time to a persistent docking environment.

Figure 9:
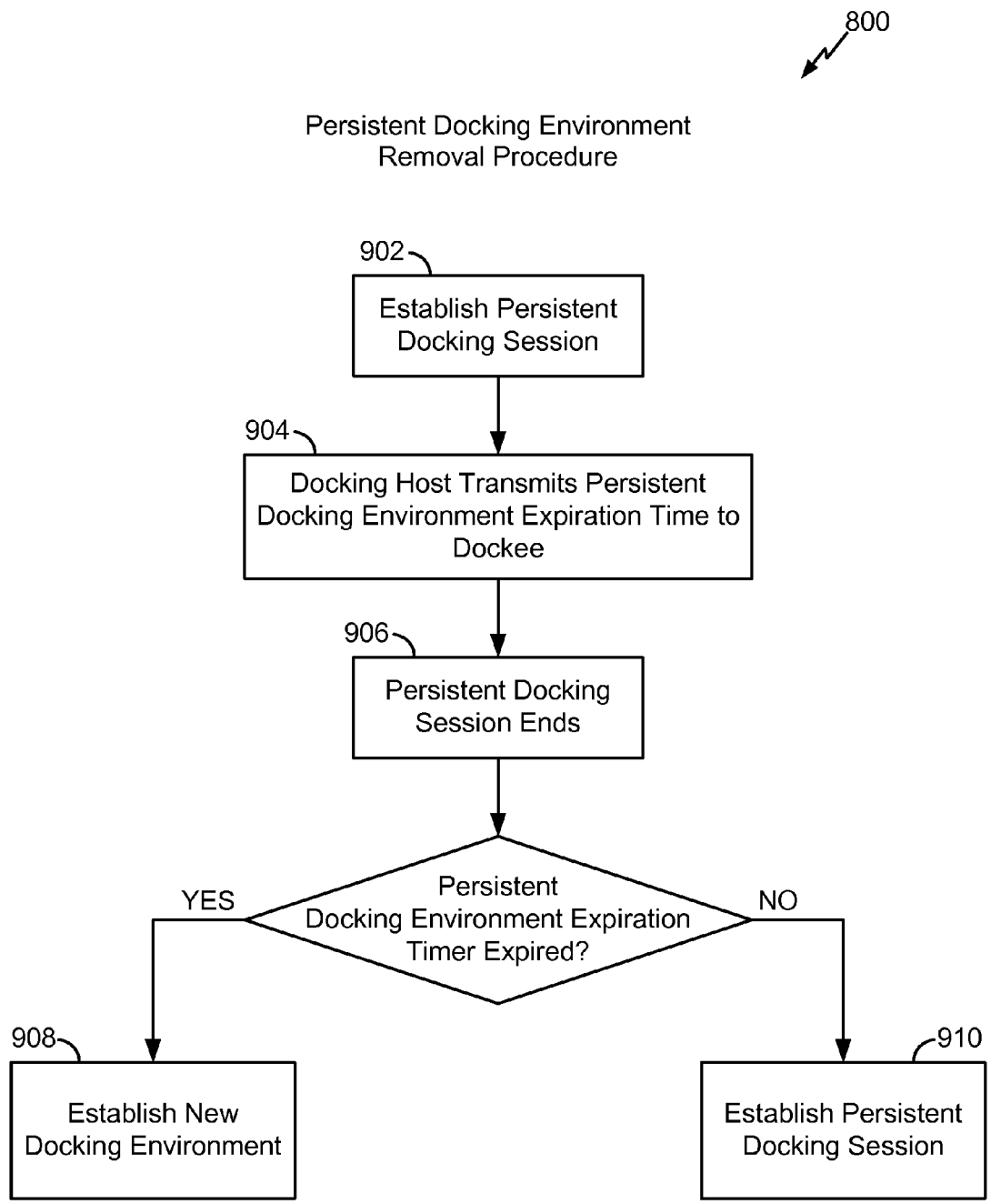
FIG. 9 is a flow chart illustrating a process for removing a stored persistent docking environment according to one example.

For example, FIG. 9 is a flow chart illustrating an exemplary process 900 for removing a persistent docking environment from memory in accordance with an aspect of the disclosure. At step 902, a persistent docking environment may be established, as described above and illustrated in FIG. 8. At step 904 the docking host 220 may, for example, generate an expiration time, and transmit the generated expiration time to the dockee 230. The dockee 230 may accordingly begin a timer corresponding to the persistent docking environment expiration time.

At step 906, for any suitable reason, the persistent docking session may end. At a later time, as the dockee 230 again approaches the docking host 220, and a subsequent docking session is sought to be established, the dockee 230 and/or the docking host 220 may determine whether the persistent docking session expiration timer has expired. If the timer has expired, the process may proceed to step 908, wherein a new docking environment may be established, e.g., utilizing one of the conventional docking procedure described above and illustrated in FIG. 4; an initial docking procedure as described above and illustrated in FIG. 7; or any other suitable docking procedure. On the other hand, if the persistent docking environment expiration timer has not expired, then the process may proceed to step 910, wherein the persistent docking environment may be established.

In some aspects of the disclosure, upon the expiration of the persistent docking environment expiration timer, the dockee may remove information corresponding to the stored persistent docking environment from its memory. In this way, if the docking host 220 transmits a request for persistent docking utilizing the expired persistent docking environment, the dockee 230 may reject the request. In other aspects of the disclosure, upon the expiration of the persistent docking environment expiration timer, the dockee may be configured to reject a request to establish a persistent docking session utilizing the expired persistent docking environment, without necessarily deleting information from memory corresponding to the expired persistent docking environment.

In another example, the docking host 220 may indicate to the dockee 230 that such a persistent docking environment has expired upon receiving a request to establish a persistent docking environment. In such a case, a conventional docking procedure may take place, and if desired, a new persistent docking environment may be established.

In a further aspect of the disclosure, the dockee 230 may transmit an explicit request (e.g., a service discovery request) configured to request the docking host 220 to remove an existing persistent docking environment.

In a still further aspect of the disclosure, the docking host 220 may transmit a response to a solicited or unsolicited service discovery response to indicate to the dockee 230 that a persistent docking environment has been removed.

Several aspects of a wireless docking system have been presented with reference to a system utilizing IEEE 802.11 "Wi-Fi" communication protocols. As those skilled in the art will readily appreciate, various aspects described throughout this disclosure may be extended to other communication systems, network architectures and communication standards. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method operable at a docking host for docking with a dockee, the method comprising:
   establishing a communication link with the dockee;
   discovering a persistent docking environment utilizing the communication link, the persistent docking environment comprising a prior docking environment established during prior communication with the dockee, wherein the discovering of the persistent docking environment comprises selecting, based on a unique persistent docking identifier associated with the dockee and one from among the plurality of available persistent docking environments, the one from among a plurality of available persistent docking environments each associated with a different group of available peripheral devices and wherein each one of a plurality of different persistent docking environment identifiers is associated with a particular dockee and a particular docking environment; and establishing a persistent docking session utilizing the selected persistent docking environment.

2. The method of claim 1, further comprising:
establishing an initial docking session between the dockee and the docking host, the initial docking session comprising the prior docking environment;
storing docking environment information corresponding to the initial docking session as the persistent docking environment; and
ending the initial docking session.

3. The method of claim 2, wherein the initial docking session and the persistent docking session utilize a wireless local area network connection between the docking host and the dockee.

4. The method of claim 2, wherein the storing of the docking environment information comprises transmitting a service discovery request message to the dockee, comprising information corresponding to the initial docking session.

5. The method of claim 2, wherein the storing of the docking environment information comprises storing the docking environment information in a memory at the docking host.

6. The method of claim 5, wherein the storing of the docking environment information further comprises:
receiving a service discovery request message from the dockee, comprising a request to store the docking environment information.

7. The method of claim 2, wherein the discovering of the persistent docking environment comprises transmitting an advertisement to the dockee to indicate to the dockee a persistent docking capability during the initial docking session.

8. The method of claim 2, wherein the discovering of the persistent docking environment comprises receiving an advertisement from the dockee during the initial docking session to indicate that the dockee supports persistent docking.

9. The method of claim 2, further comprising:
transmitting an acknowledgment to the dockee configured to confirm a creation of the persistent docking environment.

10. The method of claim 1, further comprising:
removing a stored persistent docking environment after an expiration of a persistent docking environment expiration timer.

11. The method of claim 1, further comprising:
removing a stored persistent docking environment in response to a received request, from the dockee, to remove the stored persistent docking environment.

12. The method of claim 1, further comprising:
transmitting a message to the dockee indicating that a stored persistent docking environment is no longer available.

13. The method of claim 1, wherein the prior docking environment comprises a prior communication link established between the dockee and a group of available peripheral devices associated with the selected one from among the plurality of available persistent docking environments.

14. A method operable at a dockee for docking with a docking host, the method comprising:
establishing a communication link with the docking host;
discovering a persistent docking environment utilizing the communication link, the persistent docking environment comprising a prior docking environment established during prior communication with the docking host, wherein the discovering of the persistent docking environment comprises selecting, based on a unique persistent docking identifier associated with the dockee and one from among the plurality of available persistent docking environments, the one from among a plurality of available persistent docking environments each associated with a different group of available peripheral devices, and wherein each one of a plurality of different persistent docking environment identifiers is associated with a particular dockee and a particular docking environment; and
establishing a persistent docking session utilizing the persistent docking environment.

15. The method of claim 14, further comprising:
establishing an initial docking session between the docking host and the dockee, the initial docking session comprising the prior docking environment;
storing docking environment information corresponding to the initial docking session as the persistent docking environment; and
ending the initial docking session.

16. The method of claim 15, wherein the initial docking session and the persistent docking session utilize a wireless local area network connection between the docking host and the dockee.

17. The method of claim 15, wherein the storing of the docking environment information comprises:
receiving a service discovery request message from the docking host, comprising information corresponding to the initial docking session; and
storing the information corresponding to the initial docking session in a memory at the dockee.

18. The method of claim 15, wherein the storing of the docking environment information further comprises:
transmitting a service discovery request message to the docking host, comprising a request to store the docking environment information.

19. The method of claim 15, wherein the discovering of the persistent docking environment comprises receiving an advertisement from the docking host to indicate a persistent docking capability during the initial docking session.

20. The method of claim 15, wherein the discovering of the persistent docking environment comprises transmitting an advertisement to the docking host during the initial docking session to indicate to the docking host that the dockee supports persistent docking.

21. The method of claim 15, further comprising:
receiving an acknowledgment from the docking host configured to confirm a creation of the persistent docking environment.

22. The method of claim 14, further comprising:
removing a stored persistent docking environment after an expiration of a persistent docking environment expiration timer.

23. The method of claim 22, further comprising:
receiving the persistent docking environment expiration timer from the docking host.

24. The method of claim 14, further comprising:
transmitting an explicit request to the docking host to remove a stored persistent docking environment.

25. The method of claim 14, further comprising:
receiving a message from the docking host indicating that a stored persistent docking environment is no longer available.

26. The method of claim 14, wherein the prior docking environment comprises a prior communication link established between the dockee and a group of available peripheral devices associated with the selected one from among the plurality of available persistent docking environments.

27. A docking host configured for docking with a dockee, comprising:
   at least one processor;
   a memory communicatively coupled to the at least one processor; and
   a communication interface communicatively coupled to the at least one processor,
   wherein the at least one processor is configured to:
      establish a communication link with the dockee;
      discover a persistent docking environment utilizing the communication link, the persistent docking environment comprising a prior docking environment established during prior communication with the dockee, wherein the at least one processor, being configured to discover the persistent docking environment, is further configured to select, based on a unique persistent docking identifier associated with the dockee and one from among the plurality of available persistent docking environments, the one from among a plurality of available persistent docking environments each associated with a different group of available peripheral devices, and wherein each one of a plurality of different persistent docking environment identifiers is associated with a particular dockee and a particular docking environment; and
      establish a persistent docking session utilizing the persistent docking environment.

28. The docking host of claim 27, wherein the communication interface comprises a wireless local area network (WLAN) transceiver.

29. The docking host of claim 28, wherein the communication interface further comprises a peripheral communication interface separate from the WLAN transceiver.

30. The docking host of claim 27, wherein the at least one processor is further configured to:
   establish an initial docking session between the dockee and the docking host, the initial docking session comprising the prior docking environment;
   store docking environment information corresponding to the initial docking session as the persistent docking environment; and
   end the initial docking session.

31. The docking host of claim 30, wherein the initial docking session and the persistent docking session utilize a wireless local area network connection between the docking host and the dockee.

32. The docking host of claim 30, wherein the storing of the docking environment information comprises transmitting a service discovery request message to the dockee, comprising information corresponding to the initial docking session.

33. The docking host of claim 30, wherein the at least one processor, being configured to store the docking environment information, is further configured to store the docking environment information in the memory at the docking host.

34. The docking host of claim 33, wherein the at least one processor, being configured to store the docking environment information, is further configured to receive a service discovery request message from the dockee, comprising a request to store the docking environment information.

35. The docking host of claim 30, wherein the at least one processor, being configured to discover the persistent docking environment, is further configured to transmit an advertisement to the dockee to indicate to the dockee a persistent docking capability during the initial docking session.

36. The docking host of claim 30, wherein the at least one processor, being configured to discover the persistent docking environment, is further configured to receive an advertisement from the dockee during the initial docking session to indicate that the dockee supports persistent docking.

37. The docking host of claim 30, wherein the at least one processor is further configured to transmit an acknowledgment to the dockee configured to confirm a creation of the persistent docking environment.

38. The docking host of claim 27, wherein the at least one processor is further configured to remove a stored persistent docking environment after an expiration of a persistent docking environment expiration timer.

39. The docking host of claim 27, wherein the at least one processor is further configured to remove a stored persistent docking environment in response to a received request, from the dockee, to remove the stored persistent docking environment.

40. The docking host of claim 27, wherein the at least one processor is further configured to transmit a message to the dockee indicating that a stored persistent docking environment is no longer available.

41. The docking host of claim 27, wherein the prior docking environment comprises a prior communication link established between the dockee and a group of available peripheral devices associated with the selected one from among the plurality of available persistent docking environments.

42. A dockee configured for docking with a docking host, comprising:
   at least one processor;
   a memory communicatively coupled to the at least one processor; and
   a communication interface communicatively coupled to the at least one processor,
   wherein the at least one processor is configured to:
      establish a communication link with the docking host;
      discover a persistent docking environment utilizing the communication link, the persistent docking environment comprising a prior docking environment established during prior communication with the docking host, wherein the at least one processor, being configured to discover the persistent docking environment, is further configured to select, based on a unique persistent docking identifier associated with the dockee and one from among the plurality of available persistent docking environments, the one from among a plurality of available persistent docking environments each associated with a different group of available peripheral devices, and wherein each one of a plurality of different persistent docking environment identifiers is associated with a particular dockee and a particular docking environment; and
      establish a persistent docking session utilizing the persistent docking environment.

43. The dockee of claim 42, wherein the at least one processor is further configured to:
   establish an initial docking session between the docking host and the dockee, the initial docking session comprising the prior docking environment;
   store docking environment information corresponding to the initial docking session as the persistent docking environment; and
   end the initial docking session.

44. The dockee of claim 43, wherein the initial docking session and the persistent docking session utilize a wireless local area network connection between the docking host and the dockee.

45. The dockee of claim 43, wherein the at least one processor, being configured to store the docking environment information, is further configured to:
receive a service discovery request message from the docking host, comprising information corresponding to the initial docking session; and
store the information corresponding to the initial docking session in the memory at the dockee.

46. The dockee of claim 43, wherein the at least one processor, being configured to store the docking environment information, is further configured to transmit a service discovery request message to the docking host, comprising a request to store the docking environment information.

47. The dockee of claim 43, wherein the at least one processor, being configured to discover the persistent docking environment, is further configured to receive an advertisement from the docking host to indicate a persistent docking capability during the initial docking session.

48. The dockee of claim 43, wherein the at least one processor, being configured to discover the persistent docking environment, is further configured to transmit an advertisement to the docking host during the initial docking session to indicate to the docking host that the dockee supports persistent docking.

49. The dockee of claim 43, wherein the at least one processor is further configured to receive an acknowledgment from the docking host configured to confirm a creation of the persistent docking environment.

50. The dockee of claim 42, wherein the at least one processor is further configured to remove a stored persistent docking environment after an expiration of a persistent docking environment expiration timer.

51. The dockee of claim 50, wherein the at least one processor is further configured to receive the persistent docking environment expiration timer from the docking host.

52. The dockee of claim 42, wherein the at least one processor is further configured to transmit an explicit request to the docking host to remove a stored persistent docking environment.

53. The dockee of claim 42, wherein the at least one processor is further configured to receive a message from the docking host indicating that a stored persistent docking environment is no longer available.

54. The dockee of claim 42, wherein the prior docking environment comprises a prior communication link established between the dockee and a group of available peripheral devices associated with the selected one from among the plurality of available persistent docking environments.

55. A non-transitory computer-readable storage medium operable at a docking host configured for docking with a dockee, comprising:
instructions for causing a computer to establish a communication link with the dockee;
instructions for causing the computer to discover a persistent docking environment utilizing the communication link, the persistent docking environment comprising a prior docking environment established during prior communication with the dockee, wherein the instructions causing the computer to discover the persistent docking environment further cause the computer to select, based on a unique persistent docking identifier associated with the dockee and one from among the plurality of available persistent docking environments, the one from among a plurality of available persistent docking environments each associated with a different group of available peripheral devices and wherein each one of a plurality of different persistent docking environment identifiers is associated with a particular dockee and a particular docking environment; and
instructions for causing the computer to establish a persistent docking session utilizing the persistent docking environment.

56. A non-transitory computer-readable storage medium operable at a dockee configured for docking with a docking host, comprising:
instructions for causing a computer to establish a communication link with the docking host;
instructions for causing the computer to discover a persistent docking environment utilizing the communication link, the persistent docking environment comprising a prior docking environment established during prior communication with the docking host, wherein the instructions causing the computer to discover the persistent docking environment further cause the computer to select, based on a unique persistent docking identifier associated with the dockee and one from among the plurality of available persistent docking environments, the one from among a plurality of available persistent docking environments each associated with a different group of available peripheral devices, and wherein each one of a plurality of different persistent docking environment identifiers is associated with a particular docking host and a particular docking environment; and
instructions for causing the computer to establish a persistent docking session utilizing the persistent docking environment.

57. A docking host configured for docking with a dockee, comprising:
means for establishing a communication link with the dockee;
means for discovering a persistent docking environment utilizing the communication link, the persistent docking environment comprising a prior docking environment established during prior communication with the dockee, wherein the means for discovering the persistent docking environment further comprise means to select, based on a unique persistent docking identifier associated with the dockee and one from among the plurality of available persistent docking environments, the one from among a plurality of available persistent docking environments each associated with a different group of available peripheral devices and wherein each one of a plurality of different persistent docking environment identifiers is associated with a particular dockee and a particular docking environment; and
means for establishing a persistent docking session utilizing the persistent docking environment.

58. A dockee configured for docking with a docking host, comprising:
means for establishing a communication link with the docking host;
means for discovering a persistent docking environment utilizing the communication link, the persistent docking environment comprising a prior docking environment established during prior communication with the docking host, wherein the means for discovering the persistent docking environment further comprise means to select, based on a unique persistent docking identifier associated with the dockee and one from among the plurality of available persistent docking environments, the one from among a plurality of available persistent docking environments each associated with a different group of available peripheral devices and wherein each one of a plurality of different persistent docking environment identifiers is associated with a particular dockee and a particular docking environment; and means for establishing a persistent docking session utilizing the persistent docking environment.

* * * * *